(12) United States Patent
Dussapt et al.

(10) Patent No.: US 12,122,348 B2
(45) Date of Patent: Oct. 22, 2024

(54) COMMERCIAL VEHICLE COMPRISING A PNEUMATIC SYSTEM AND METHOD FOR CONTROLLING A PNEUMATIC SYSTEM

(71) Applicant: VOLVO TRUCK CORPORATION, Gothenburg (SE)

(72) Inventors: Fabrice Dussapt, Lyons (FR); Xavier Blanc, Chassieu (FR); Hugo Bebon, Saint-Priest (FR)

(73) Assignee: VOLVO TRUCK CORPORATION, Gothenburg (SE)

( * ) Notice: Subject to any disclaimer, the term of this patent is extended or adjusted under 35 U.S.C. 154(b) by 40 days.

(21) Appl. No.: 17/820,736

(22) Filed: Aug. 18, 2022

(65) Prior Publication Data

US 2023/0111920 A1 Apr. 13, 2023

(30) Foreign Application Priority Data

Oct. 7, 2021 (EP) .................................... 21201512

(51) Int. Cl.
*B60T 8/92* (2006.01)
*B60T 13/26* (2006.01)

(52) U.S. Cl.
CPC .............. *B60T 8/92* (2013.01); *B60T 13/268* (2013.01); *B60T 2270/88* (2013.01)

(58) Field of Classification Search
CPC ........ B60T 8/92; B60T 13/268; B60T 13/683; B60T 13/662; B60T 17/02; B60T 17/22;
(Continued)

(56) References Cited

U.S. PATENT DOCUMENTS 4,556,259 A * 12/1985 Feldmann ............... B60T 13/58
 416/169 R
5,255,961 A * 10/1993 Graham ................ B60T 15/041
 188/170

(Continued)

FOREIGN PATENT DOCUMENTS

| DE | 19613769 C2 | 8/1997 |
| DE | 102005045269 A1 | 3/2007 |
| EP | 0088911 A1 | 9/1983 |

OTHER PUBLICATIONS

Extended European Search Report in corresponding European Application No. 21201512.7 dated Apr. 28, 2022 (5 pages).

*Primary Examiner* — Robert A. Siconolfi
*Assistant Examiner* — San M Aung
(74) *Attorney, Agent, or Firm* — Venable LLP; Jeffri A. Kaminski

(57) ABSTRACT

A commercial vehicle with a pneumatic system includes an air management system comprising an air compressor (11), a low-pressure circuit configured to store and supply compressed air within a low-pressure range, a high-pressure circuit configured to store and supply compressed air within a high-pressure range, a braking system presenting a usual braking operation with compressed air at pressures in the low-pressure range, and an emergency braking operation with compressed air at pressures in the high-pressure range, wherein the air management system is configured to supply the braking system: for the usual braking operation, with compressed air from the low pressure circuit, and for the emergency braking operation, with compressed air from the high-pressure circuit.

13 Claims, 4 Drawing Sheets

(58) Field of Classification Search
CPC .. B60T 17/086; B60T 2270/88; B60T 15/043; F16D 65/28; F16D 2121/02; F16D 2125/582; F16D 2127/06; F16D 2129/02
USPC .......................................................... 303/9
See application file for complete search history.

(56) References Cited

U.S. PATENT DOCUMENTS

| | | | |
|---|---|---|---|
| 6,267,455 B1* | 7/2001 | Graham | B60T 17/083 303/85 |
| 2010/0036576 A1* | 2/2010 | Diekmeyer | B60T 17/02 303/9.66 |
| 2012/0112523 A1* | 5/2012 | Stoehr | B60T 17/02 303/2 |
| 2019/0248350 A1* | 8/2019 | Wulf | B60T 13/683 |
| 2019/0248351 A1* | 8/2019 | Wulf | B60T 13/683 |
| 2019/0337502 A1* | 11/2019 | Farres | B60T 15/027 |

* cited by examiner

COMMERCIAL VEHICLE COMPRISING A PNEUMATIC SYSTEM AND METHOD FOR CONTROLLING A PNEUMATIC SYSTEM

TECHNICAL FIELD

This disclosure pertains to the field of commercial vehicle comprising a pneumatic system.

BACKGROUND ART

Commercial vehicles are generally equipped with low-pressure equipments, such as trailer, park brake, pneumatic auxiliaries and others, operating with compressed air at pressures in a low-pressure range, especially between 1 bars and 8.5 bars. They are also equipped with high-pressure equipments, such as suspensions and service brake or others, operating with compressed air at pressures in a high-pressure range, especially between 9 bars and 12.5 bars.

The low-pressure and high-pressure equipments are parts of a pneumatic system further including an air management system which comprises:
an air compressor delivering compressed air,
a low-pressure circuit connected to the air compressor and configured to store and supply compressed air within the low-pressure range, the low-pressure equipments being connected to the low-pressure circuit,
a high-pressure circuit connected to the air compressor and configured to store and supply compressed air within the high-pressure range, the high-pressure equipments being connected to the high-pressure circuit.

The pneumatic system further comprises a braking system operating with compressed air. In particular, in most of the braking situations, the braking system has a usual braking operation in which it operates with compressed air at pressures in the low-pressure range, especially below 7 bars. In some braking situations, the braking system has an emergency braking operation in which it operates with compressed air at pressures in the high-pressure range, especially up to 10 bars.

In known air management system, the braking system is connected to the high-pressure circuit where compressed air is stored in the high-pressure range. As long as the braking system is used, compressed air in the high-pressure circuit is consumed and the air compressor needs to be operated so as to deliver compressed air within the high-pressure range.

However, such operation of the compressor at high-pressure lowers the compressor efficiency due to higher torque and higher energy consumption, i.e. lower volumetric efficiency and lower air flow.

SUMMARY

This disclosure improves the situation.

To this end, according to an aspect, it is proposed a Commercial vehicle comprising
a pneumatic system including:
low-pressure equipments operating with compressed air at pressures in a low-pressure range, and high-pressure equipments operating with compressed air at pressures in a high-pressure range, the high-pressure range being higher than the low pressure range,
an air management system comprising:
an air compressor delivering compressed air,
a low-pressure circuit connected to the air compressor and configured to store and supply compressed air within the low-pressure range, the low-pressure equipments being connected to the low-pressure circuit,
a high-pressure circuit connected to the air compressor and configured to store and supply compressed air within the high-pressure range, the high-pressure equipments being connected to the high-pressure circuit,
wherein the pneumatic system further comprises a braking system presenting a usual braking operation with compressed air at pressures in the low-pressure range, and an emergency braking operation with compressed air at pressures in the high-pressure range, wherein the braking system is connected to the low-pressure circuit and to the high-pressure circuit, the air management system being configured to supply the braking system:
for the usual braking operation, with compressed air from the low pressure circuit, and
for the emergency braking operation, with compressed air from the high-pressure circuit Hence, the air compressor runs most of time within the low-pressure range, thereby lowering energy consumption which in turns enhances compressor efficiency.

The low-pressure circuit may have at least one low-pressure braking outlet branch, and the high-pressure circuit may have at least one high-pressure braking outlet branch, the low-pressure braking outlet branch being provided with a low-pressure valve, such as select-high valve, connected to the braking system and the high-pressure braking outlet branch being provided with a high-pressure valve, such as Boost-valve, connected to the low-pressure valve,
the high-pressure valve having a passing state in which compressed air from the high-pressure circuit is allowed to pass through the high-pressure braking outlet branch towards the low-pressure valve, and a blocking state in which compressed air from the high-pressure circuit is prevented to pass through the high-pressure braking outlet branch,
the low-pressure valve having a passing state in which compressed air from the low-pressure circuit is allowed to pass through the low-pressure braking outlet branch towards the baking system, and a blocking state in which compressed air from the low-pressure circuit is prevented to pass through the low-pressure braking outlet branch while compressed air from the high-pressure circuit is allowed to pass through the low-pressure braking outlet branch towards the braking system,
the air management system being configured so that:
for the usual braking operation, the high-pressure valve is in the blocking state and the low-pressure valve is in the passing state,
for the emergency braking operation, the high-pressure valve is in the passing state and the low-pressure valve is in the blocking state.

The air management system may be configured so that, for the emergency braking operation, the low-pressure valve is maintained in the passing state while the high-pressure valve is moving from the blocking state to the passing state, and is moved to the blocking state when the high-pressure valve is in the passing state. For emergency braking, as there may be electrical and pneumatic latencies (i.e. waiting time), the compressed air will be firstly supplied from the low-pressure circuit until the high-pressure valve is opened and high-pressure circuit takes over to supply compressed air within the high-pressure range.

The low-pressure braking outlet branch may comprise at least one low-pressure tank configured to store compressed air within the low-pressure range, the low-pressure tank presenting a tank outlet connected to the low-pressure valve, the high-pressure braking outlet branch may comprise at least one high-pressure tank configured to store compressed air within the high-pressure range, the high-pressure tank presenting a tank outlet connected to the high-pressure valve.

The low-pressure circuit may comprise a rear low-pressure braking outlet branch connected to a rear part of the braking system, and a front low-pressure braking outlet branch connected to a front part of the braking system.

The air management system may comprise a control unit configured to register low-pressure cut-in pressure and high-pressure cut-in pressure, to monitor pressure within the low-pressure and high-pressure circuits, the control unit controlling the air compressor so as to start running said air compressor if:
  pressure within the low-pressure circuit is below the low-pressure cut-in pressure, or
  pressure within the high-pressure circuit is below the high-pressure cut-in pressure.

The control unit may be configured to register low-pressure cut-off pressure and high-pressure cut-off pressure, the control unit controlling the air compressor, as said air compressor is running, so that:
  if the compressor had been started because pressure within the low-pressure circuit was below the low-pressure cut-in pressure, then
    if pressure within the high-pressure circuit is below the high-pressure cut-in pressure, then the air compressor stops running when pressure in the high-pressure circuit is above or equal to the high-pressure cut-off pressure, else the air compressor stops running when pressure in the low-pressure circuit is above or equal to the low-pressure cut-off pressure,
  else if the compressor had been started because pressure within the high-pressure circuit was below the high-pressure cut-in pressure, the air compressor stops running when the pressure in the high-pressure circuit is above or equal to the high-pressure cut-off pressure.

The air management system may be configured so that, when pressure in the low-pressure circuit decreases down to a critical pressure level due to a demand for compressed air at pressures within the low-pressure range by the low-pressure equipments, the low-pressure equipments are connected to the high-pressure circuit, said high-pressure circuit taking over supply of compressed air to the low-pressure equipments.

In another aspect, it is proposed a method for controlling a pneumatic system of a commercial vehicle as defined previously, comprising:
  for the usual braking operation, supplying the braking system with compressed air from the low pressure circuit, and
  for the emergency braking operation, supplying the braking system with compressed air from the high-pressure circuit.

The method for controlling may comprise:
  for the usual braking operation, setting the high-pressure valve in the blocking state and the low-pressure valve in the passing state,
  for the emergency braking operation, setting the high-pressure valve in the passing state and the low-pressure valve in the blocking state.

The method for controlling may comprise for the emergency braking operation, maintaining the low-pressure valve in the passing state while the high-pressure valve is moving from the blocking state to the passing state, and moving the low-pressure valve to the blocking state when the high-pressure valve is in the passing state.

The method for controlling may comprise starting running the air compressor if:
  pressure within the low-pressure circuit is below the low-pressure cut-in pressure, or
  pressure within the high-pressure circuit is below the high-pressure cut-in pressure.

The method for controlling may comprise as the air compressor is running:
  if the compressor had been started because pressure within the low-pressure circuit was below the low-pressure cut-in pressure, then
    if pressure within the high-pressure circuit is below the high-pressure cut-in pressure, then stop running the air compressor when pressure in the high-pressure circuit is above or equal to the high-pressure cut-off pressure, else stop running the air compressor when pressure in the low-pressure circuit is above or equal to the low-pressure cut-off pressure,
  else if the compressor had been started because pressure within the high-pressure circuit was below the high-pressure cut-in pressure, stop running the air compressor when the pressure in the high-pressure circuit is above or equal to the high-pressure cut-off pressure.

The method for controlling may comprise, when pressure in the low-pressure circuit decreases down to a critical pressure level due to a demand for compressed air at pressures within the low-pressure range by the low-pressure equipments, connecting the low-pressure equipments to the high-pressure circuit so that said high-pressure circuit takes over supply of compressed air to the low-pressure equipments.

BRIEF DESCRIPTION OF DRAWINGS

Other features, details and advantages will be shown in the following detailed description and on the figures, on which.

DESCRIPTION OF EMBODIMENTS

Figure 1:
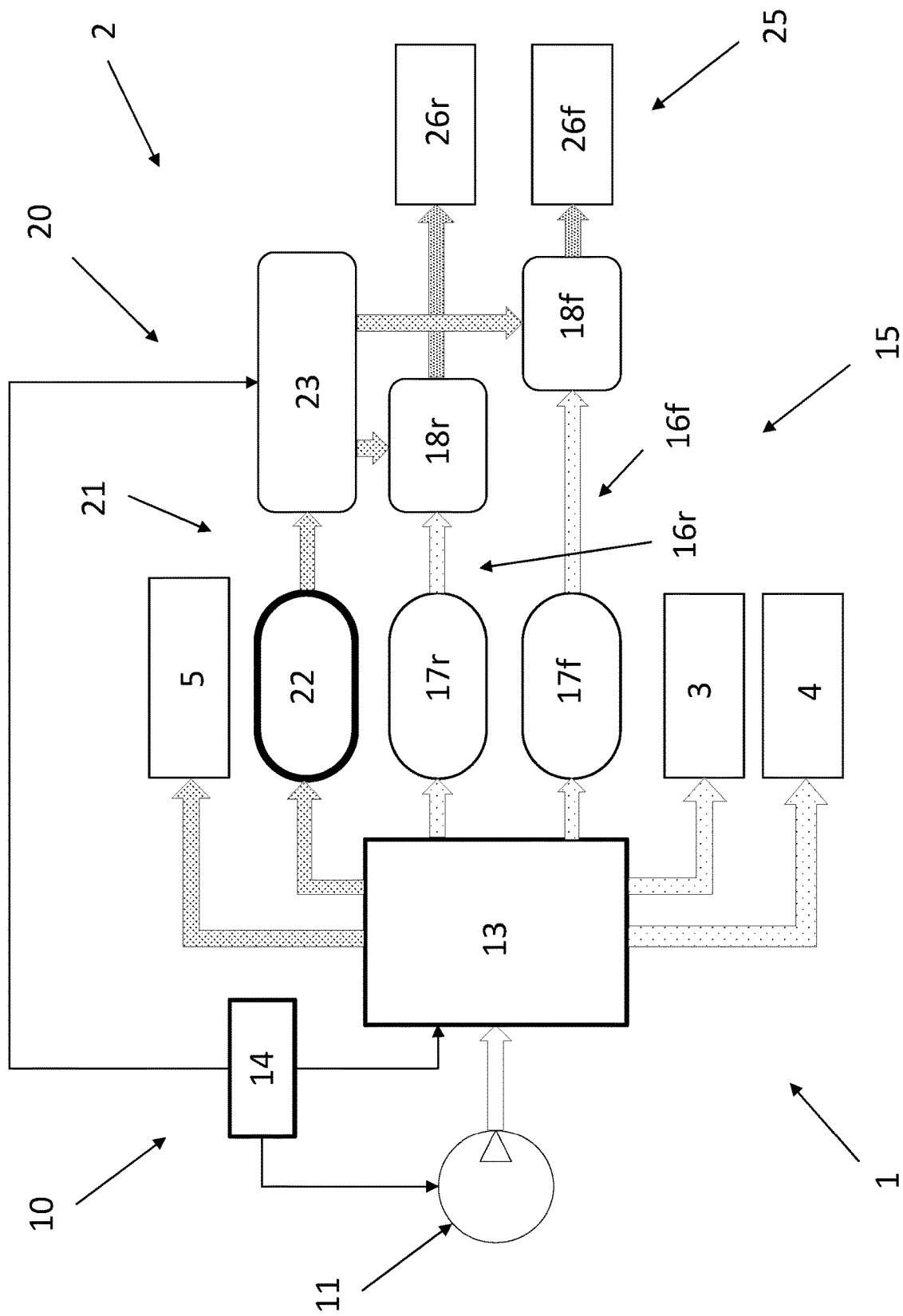
FIG. 1 is a schematic representation of a pneumatic system of commercial vehicle, the pneumatic system including a braking system and an air management system comprising an air compressor delivering compressed air to low-pressure and high-pressure circuits, the braking system being supplied with compressed air from the low-pressure circuit for a usual braking operation, and with compressed air from the high-pressure circuit for an emergency braking operation.

FIG. 1 schematically represents a pneumatic system 2 of a commercial vehicle 1, such as a truck.

The pneumatic system 2 comprises low-pressure equipments, such as a trailer 3, a park brake 4 and other pneumatic auxiliaries, operating with compressed air at pressures in a low-pressure range, especially between 1 bars and 8.5 bars. It also comprises high-pressure equipments, such as suspensions 5 and service brake or others, operating with compressed air at pressures in a high-pressure range, especially between 9 bars and 12.5 bars. In the following and the drawings, the term "LP" stands for "low-pressure" and the term "HP" stands for "high-pressure".

The pneumatic system 2 further includes an air management system 10 which comprises an air compressor 11 delivering compressed air. For example, the air compressor 11 may be driven by an internal combustion engine in case of a conventional commercial vehicle or driven by an e-motor in case of an electric commercial vehicle.

Connected to the air compressor 11, are:
- a low-pressure circuit 15 configured to store and supply compressed air within the low-pressure range, the low-pressure equipments being connected to the low-pressure circuit 15,
- a high-pressure circuit 20 configured to store and supply compressed air within the high-pressure range, the high-pressure equipments being connected to the high-pressure circuit 20.

For braking, the commercial vehicle 1 has a braking system 25 of pneumatic kind, namely operating with compressed air, belonging to the pneumatic system 2. In most of braking situations, the braking system 25 has a usual braking operation in which it operates with compressed air at pressures in the low-pressure range, especially below 7 bars. In some braking situations, the braking system 25 has an emergency braking operation in which it operates with compressed air at pressures in the high-pressure range, especially up to 10 bars.

The braking system 25 is connected to both low-pressure 15 and high-pressure 20 circuits. To that end, the low-pressure circuit 15 has one or several low-pressure braking outlet branches 16r, 16f and the high-pressure circuit 20 has one or several high-pressure braking outlet branches 21. The low-pressure 16r, 16f and high-pressure 21 braking outlet branches are connected to the air compressor 11 through a mechatronic air modulator 13 including an arrangement of valves, sensors and other flow regulation devices configured to supply these low-pressure 16r, 16f and high-pressure 21 braking outlet branches in an appropriate manner. Especially, upstream the low-pressure braking outlet branch 16r, 16f, the mechatronic air modulator 13 has a pressure limiter valve to store and supply air at the upper limit of the low-pressure range, for example 8.5 bars.

In the illustrated embodiment, although not limited thereto, the low-pressure circuit 20 comprises a rear low-pressure braking outlet branch 16r connected to a rear part 26r of the braking system 25 which operates on rear wheels of the commercial vehicle 1, and a front low-pressure braking outlet branch 16f connected to a front part 26f of the braking system 25 which operates on front wheels of the commercial vehicle 1.

Each of the rear 16r and front 16f low-pressure braking outlet branches comprises a low-pressure tank 17r, 17f configured to store compressed air within the low-pressure range. The low-pressure tank 17r, 17f presents a tank outlet connected to the rear part 26r of the braking system 25 through a low-pressure valve 18r, 18f. In a variant, each of the low-pressure braking outlet branches 16r, 16f could present two or more low-pressure tanks 17r, 17f connected to separate low-pressure valves 18r, 18f or to the same low-pressure valve 18.

Similarly, the high-pressure circuit 20 has a high-pressure braking outlet branch 21 comprising a high-pressure tank 22 configured to store compressed air within the high-pressure range. The high-pressure tank 22 presents a tank outlet connected to a high-pressure valve 23 which is in turn connected to the low-pressure valves 18r, 18f of the rear 16r and front 16f low-pressure braking outlet branches. In a variant, the high-pressure braking outlet branch 21 could present two or more high-pressure tanks 22 connected to separate high-pressure valves 23 or to the same high-pressure valve 23.

The high-pressure valve 23 has a passing state in which compressed air from the high-pressure circuit 20 is allowed to pass through the high-pressure braking outlet branch 21 towards the low-pressure valves 18r, 18f of the rear 16r and front 16f low-pressure braking outlet branches. The high-pressure valve 23 also has a blocking state in which compressed air from the high-pressure circuit 20 is prevented to pass through the high-pressure braking outlet branch 21. For example, the high-pressure valve 23 may be a boost valve such as a solenoid valve normally in the blocking state.

The low-pressure valves 18r, 18f have each a passing state in which compressed air from the low-pressure circuit 15 is allowed to pass through the rear 16r and front 16f low-pressure braking outlet branches towards rear 26r and front 26f parts of the braking system 25 respectively. The low-pressure valves 18r, 18f also have each a blocking state in which compressed air from the low-pressure circuit 15 is prevented to pass through the rear 16r and front 16f low-pressure braking outlet branches while compressed air from the high-pressure circuit 20 is allowed to pass through the high-pressure valve 23 in the passing state and the rear 16r and front 16f low-pressure braking outlet branches towards the rear 26r or front 26f parts of the baking system 25. For example, the low-pressure valves 18r, 18f may be select high valves arranged close to rear and front service brake modulator modules.

The air management system 10 comprises a control unit 14 controlling the high-pressure 23 and low-pressure 18r, 18f valves so that:
- for the usual braking operation, the high-pressure valve 23 is in the blocking state and the low-pressure valves 18r, 18f are in the passing state, the braking system 25 being then supplied with compressed air from the low pressure circuit 15,
- for the emergency braking operation, the high-pressure valve 23 is in the passing state and the low-pressure valves 18r, 18f are in the blocking state, the braking system 25 being then supplied with compressed air from the high-pressure circuit 20.

The control unit 14 of the air management system 10 is hence configured to detect the emergency braking operation through an appropriate braking operation sensing device, for example based on brake pedal position and actuation time.

To take into account electrical and pneumatic latencies when the high-pressure 23 and low-pressure 18r, 18f valves change between the passing and blocking states, the control unit 14 of the air management system 10 is configured so that, for the emergency braking operation, the low-pressure valves 18r, 18f are maintained in the passing state while the high-pressure valve 23 is moving from the blocking state to the passing state. The low-pressure valves 18r, 18f are moved to the blocking state when the high-pressure valve 23 is in the passing state. In doing so, for the emergency braking operation, the braking system 25 can be immediately supplied with compressed air from the low-pressure circuit 15 until the high-pressure circuit 20 takes over supply of compressed air to reach the desired level of pressure.

Besides, depending on the demand for compressed air, especially in case the pressure in low-pressure circuit 15 decreases due to several air consumptions down to a critical pressure level, LP threshold, the high-pressure valve 23 may be moved to the passing state to take over supply of compressed air.

Figure 2:
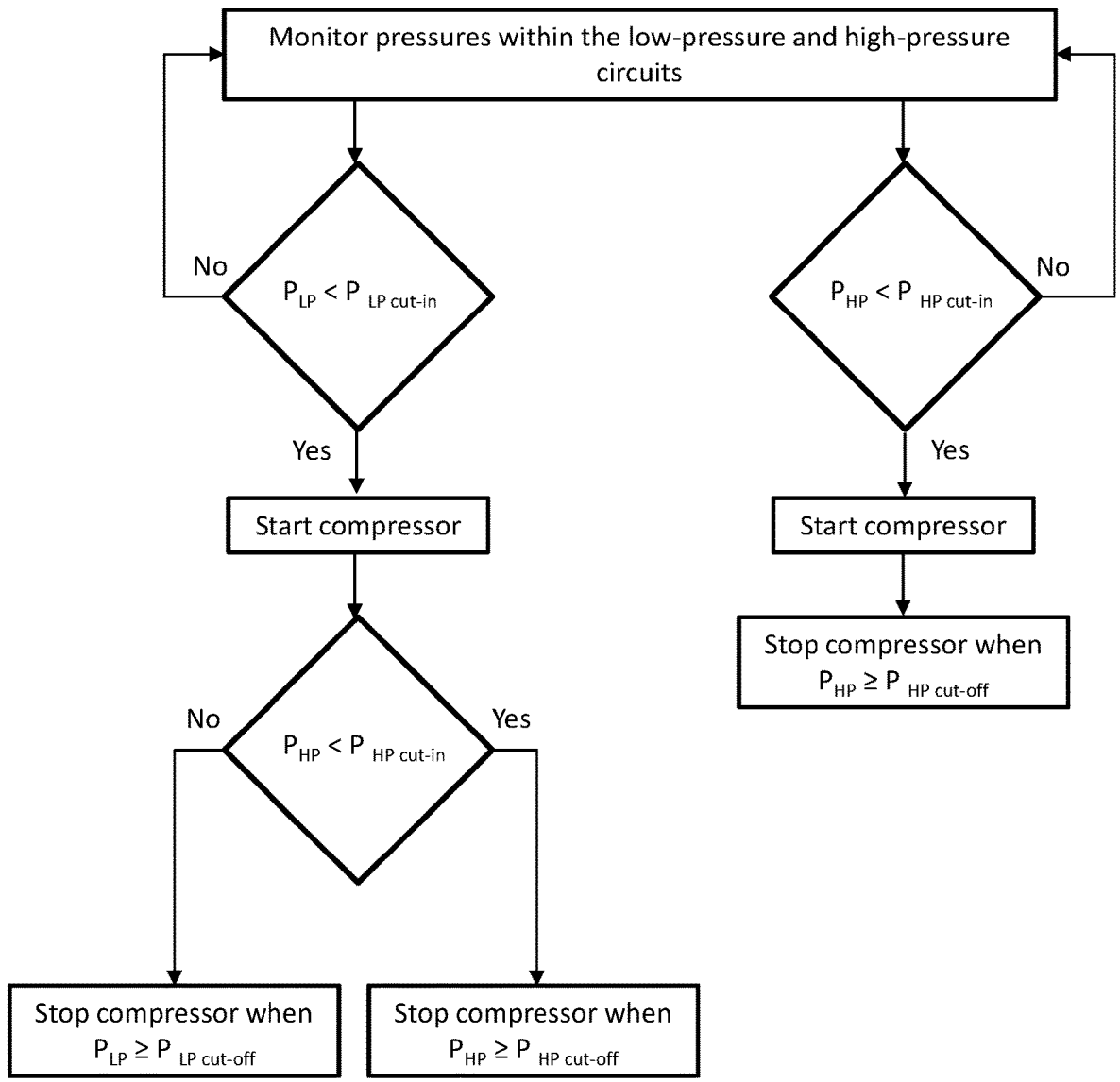
FIG. 2 is a flowchart illustrating steps of a method for controlling operation of the air compressor of the pneumatic system of FIG. 1 implemented by a control unit of the air management system.

FIG. 2 illustrates steps of a method for controlling operation of the air compressor 11 of the pneumatic system 2 implemented by the control unit 14 of the air management system 10.

The control unit 14 may comprise a memory into which low-pressure cut-in pressure, for example of 7.5 bars, and high-pressure cut-in pressure, for example of 11 bars, as well as low-pressure cut-off pressure, for example of 8.5 bars, and high-pressure cut-off pressure, for example of 12.5 bars, are stored. The control unit 14 monitors pressure within the low-pressure 15 and high-pressure 20 circuits through pressure sensors arranged appropriately and controls the air compressor 11 so that it starts running:
  either if the pressure within the low-pressure circuit 15 is below the low-pressure cut-in pressure,
  or if the pressure within the high-pressure circuit 20 is below the high-pressure cut-in pressure.

Then, as the air compressor 11 is running, if the air compressor 11 had been started because pressure within the low-pressure circuit 15 was below the low-pressure cut-in pressure, if pressure within the high-pressure circuit 20 is below the high-pressure cut-in pressure, the air compressor 11 stops running when pressure in the high-pressure circuit 20 is above or equal to the high-pressure cut-off pressure. Else the air compressor 11 stops running when pressure in the low-pressure circuit 15 is above or equal to the low-pressure cut-off pressure.

Else if the air compressor 11 had been started because pressure within the high-pressure circuit 20 was below the high-pressure cut-in pressure, the air compressor 11 stops running when the pressure in the high-pressure circuit 20 is above or equal to the high-pressure cut-off pressure.

Figure 3:
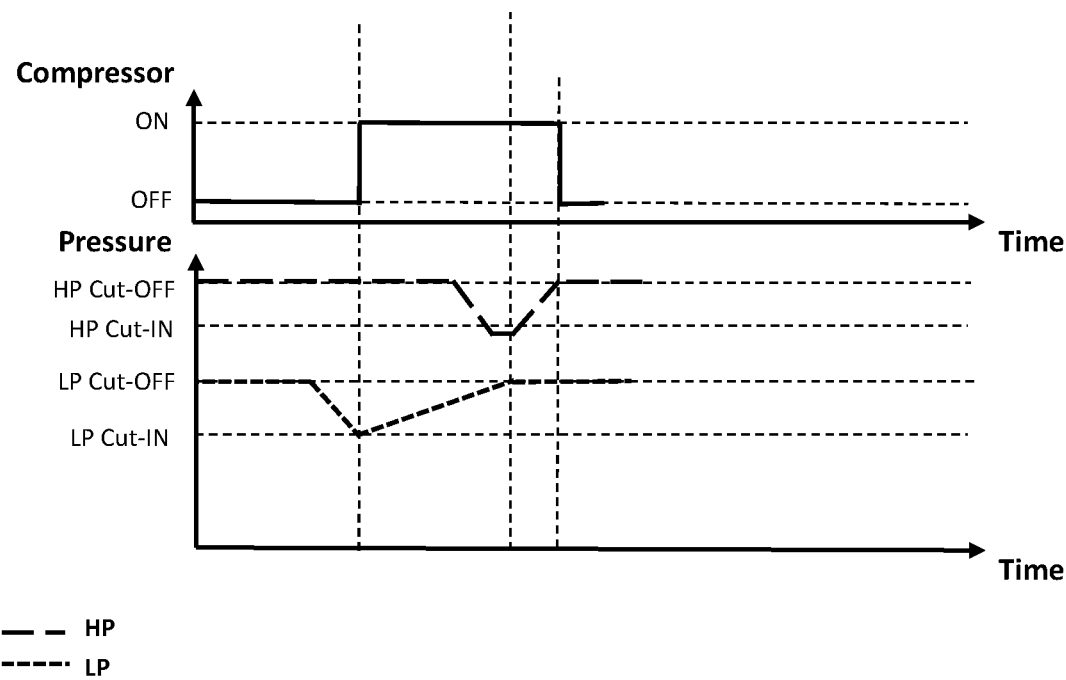
FIG. 3 is a diagram illustrating an implementation of the method of FIG. 2 when pressure in the low-pressure circuit is below a low-pressure cut-in pressure, and pressure in the high-pressure circuit decreases below a high-pressure cut-in pressure.

In other words, FIG. 3 shows a case where the air compressor 11 has been started because pressure in low-pressure circuit 15 was below low-pressure cut-in pressure ($P_{LP} < P_{LP\ cut-in}$). If pressure in high-pressure circuit 20 has decreased and is below the high-pressure cut-in pressure ($P_{HP} < P_{HP\ cut-in}$) when pressure in the low-pressure circuit 15 has reached low-pressure cut-off pressure ($P_{LP} = P_{LP\ cut-off}$), then the air compressor 11 continues working and it is stopped when pressure in the high-pressure circuit 20 has reached the high-pressure cut-off pressure ($P_{HP} \geq P_{HP\ cut-off}$).

Figure 4:
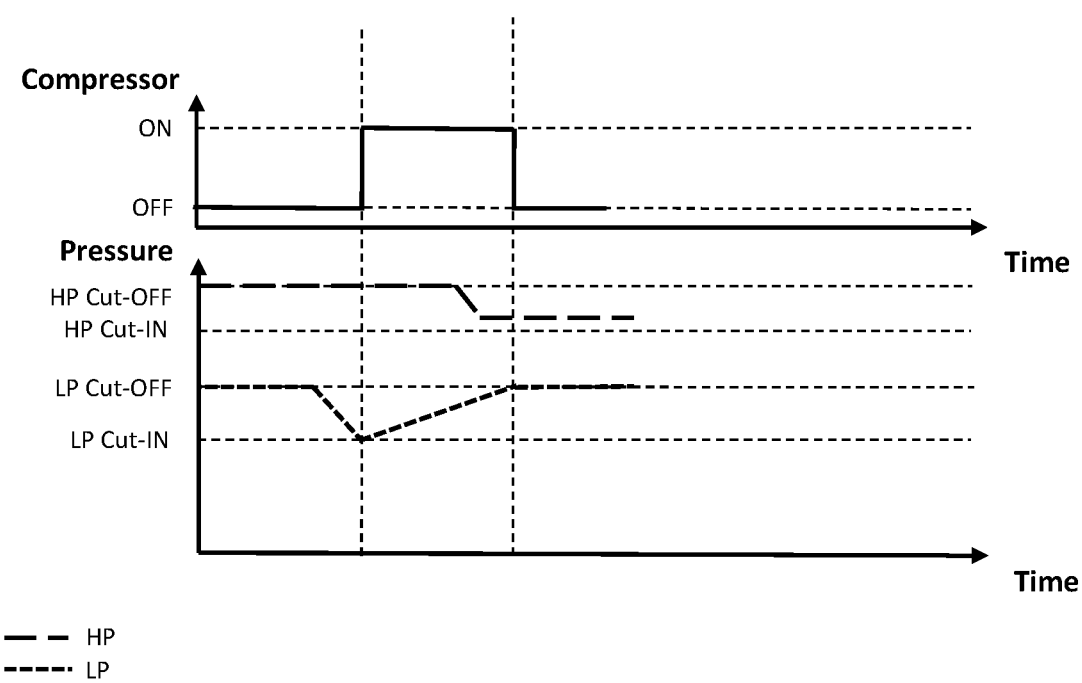
FIG. 4 is a diagram illustrating an implementation of the method of FIG. 2 when pressure in the low-pressure circuit is below a low-pressure cut-in pressure, and pressure in the high-pressure circuit remains above the high-pressure cut-in pressure.

In FIG. 4, if pressure in the high-pressure circuit 20 is still above the high-pressure cut-in pressure ($P_{HP} > P_{HP\ cut-in}$) when pressure in the low-pressure circuit 15 has reached the low-pressure cut-off pressure ($P_{LP} \geq P_{LP\ cut-off}$), the air compressor 11 is stopped.

Figure 5:
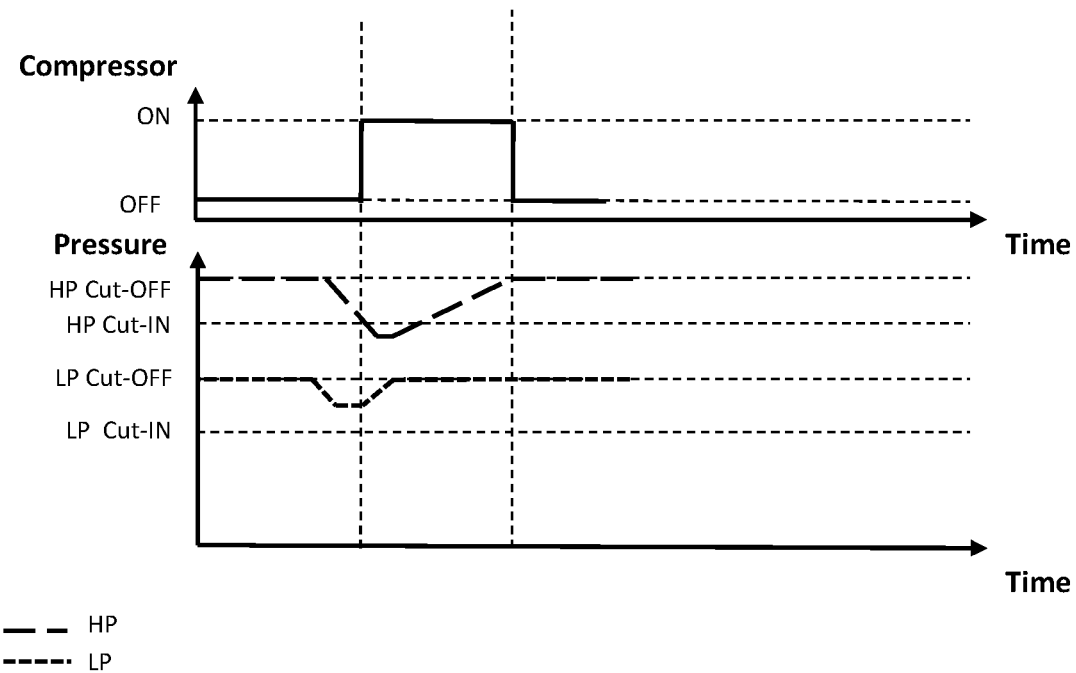
FIG. 5 is a diagram illustrating an implementation of the method of FIG. 2 when pressure in the high-pressure circuit is below the high-pressure cut-in pressure.

FIG. 5 shows a case where the air compressor 11 has been started because pressure in the high-pressure circuit 20 was below the high-pressure cut-in pressure ($P_{HP} < P_{HP\ cut-in}$).

The air compressor 11 is stopped when pressure in the high-pressure circuit 20 has reached the high-pressure cut-off pressure ($P_{HP} \geq P_{HP\ cut-off}$).

Figure 6:
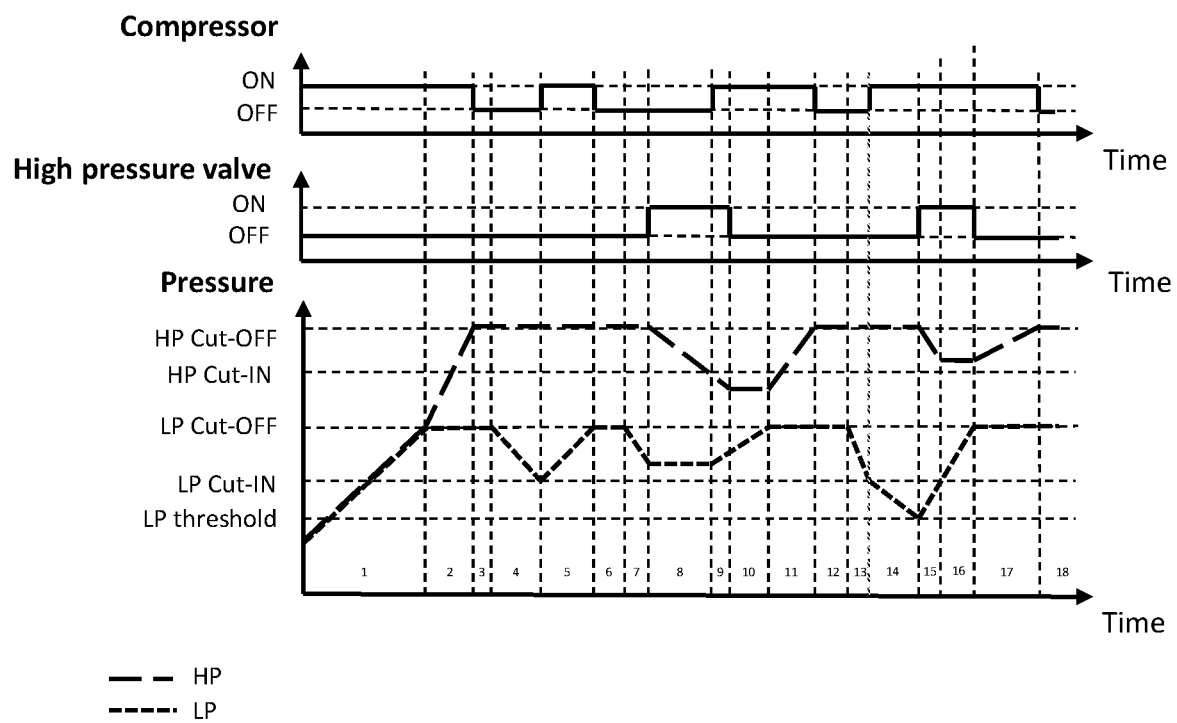
FIG. 6 is a diagram illustrating an example of implementation of the pneumatic system of FIG. 1.

FIG. 6 provides an example, given as a purely illustrative and non-limitative purpose, of operation of the pneumatic system 2 implementing the method for controlling disclosed previously.

At stage 1, both low-pressure 15 and high-pressure 20 circuits are supplied with compressed air from the air compressor 11 to inflate from very low pressure in the air management system 10.

At stage 2, the pressure within the low-pressure circuit 15 reaches the low-pressure cut-off pressure. Inflation with compressed air from the air compressor 11 continues for the high-pressure circuit 20 until the pressure within the high-pressure circuit 20 reaches the high-pressure cut-off pressure, at stage 3, causing the air compressor 11 to be stopped.

At stage 4, compressed air is consumed, e.g. about 3 bars at brakes, taken only from the low-pressure circuit 15, down to low-pressure cut-in pressure.

At stage 5, the air compressor 11 is restarted to inflate the low-pressure circuit 15 only until the pressure within the low-pressure circuit 15 reaches the low-pressure cut-off pressure, at stage 6, causing once again the air compressor 11 to be stopped.

At stage 7, compressed air is consumed, e.g. about 10 bars at brakes or 12 bars at suspensions 5, taken first from the low-pressure circuit 15.

A stage 8, as compressed air keeps on being consumed, higher pressure is needed. The high-pressure valve 23 is activated by being moved to the passing state so that compressed air is then taken from the high-pressure circuit 20 instead of the low-pressure circuit 15 which is closed by placing the low-pressure valves 18r, 18f in the blocking state. Consumption of compressed air continues down to high-pressure cut-in pressure. As the pressure in the high-pressure circuit 20 reaches the high-pressure cut-in pressure, the air compressor 11 is restarted.

At stage 9, the low-pressure circuit 15 is inflated while compressed air in the high-pressure circuit 20 keeps on being consumed.

At stage 10, consumption of compressed air is over, inflation continues in the low-pressure circuit 15.

At stage 11, as at stage 2 the pressure within the low-pressure circuit 15 reaches the low-pressure cut-off pressure but inflation continues for the high-pressure circuit 20.

At stage 12, as at stage 3, the pressure within the high-pressure circuit 20 reaches the high-pressure cut-off pressure and the air compressor 11 is stopped.

At stage 13, successive consumptions of compressed air of about 3 bars occur during a long time so that pressure within the low-pressure circuit 15 decreases under the low-pressure cut-in pressure. The air compressor 11 is restarted.

At stage 14, as the successive consumptions of compressed air continue, pressure within the low-pressure circuit 15 keeps on decreasing, even with the air compressor 11 running, down to a low-pressure threshold.

At stage 15, the high-pressure valve 23 is placed in the passing state and the low-pressure valves 18r, 18f are placed in the blocking state so that compressed air is taken from the high-pressure circuit 20 and successive air consumptions continue in the high-pressure circuit 20. No more consumption of compressed air occurs in the low-pressure circuit 15 which inflates since the air compressor 11 is running.

At stage 16, no more consumption of compressed air occurs and since the air compressor 11 is still running, pressure increases in the low-pressure circuit 15 and reaches the low-pressure cut-off pressure.

At stage 17, the low-pressure circuit 15 is fully inflated, the high-pressure valve 23 is placed in the blocking state. The air compressor 11 is still running, inflating the high-pressure circuit 20 until the high-pressure cut-off pressure is reached.

At stage 18, both low-pressure 15 and high-pressure 20 circuits are inflated, the air compressor 11 is stopped.

As apparent from the above, the air compressor 11 is stopped during stages 3, 4, 6 to 8, 12, 13 and 18, and it is running at low pressure during stages 1, 5, 9, 10 and 14 to 16. And the air compressor 11 is running at high pressure only during stages 2, 11 and 17. Hence, the air compressor 11 is working most of the time at low pressure, where compression of air is less energy consuming and efficiency is higher. It works at high pressure, with higher energy consumption and lower efficiency, only occasionally.

The invention claimed is:

1. Commercial vehicle comprising a pneumatic system including:
    low-pressure equipments operating with compressed air at pressures in a low-pressure range, and high-pressure equipments operating with compressed air at pressures in a high-pressure range, the high-pressure range being higher than the low pressure range,
    an air management system comprising:
    an air compressor delivering compressed air,
    a low-pressure circuit connected to the air compressor and configured to store and supply compressed air within the low-pressure range, the low-pressure equipments being connected to the low-pressure circuit,
    a high-pressure circuit connected to the air compressor and configured to store and supply compressed air within the high-pressure range, the high-pressure equipments being connected to the high-pressure circuit,
    wherein the pneumatic system further comprises a braking system presenting a usual braking operation with compressed air at pressures in the low-pressure range, and an emergency braking operation with compressed air at pressures in the high-pressure range,
    the commercial vehicle being characterized in that the braking system is connected to the low-pressure circuit and to the high-pressure circuit, the air management system being configured to supply the braking system:
    for the usual braking operation, with compressed air from the low pressure circuit, and
    for the emergency braking operation, with compressed air from the high-pressure circuit,
    and wherein the air management system comprises a control unit configured to register low-pressure cut-in pressure and high-pressure cut-in pressure, to monitor pressure within the low-pressure and high-pressure circuits, the control unit controlling the air compressor so as to start running said air compressor if:
        pressure within the low-pressure circuit is below the low-pressure cut-in pressure, or
        pressure within the high-pressure circuit is below the high-pressure cut-in pressure.

2. Commercial vehicle according to claim 1, wherein the low-pressure circuit has at least one low-pressure braking outlet branch, and the high-pressure circuit has at least one high-pressure braking outlet branch, the low-pressure braking outlet branch being provided with a low-pressure valve connected to the braking system and the high-pressure braking outlet branch being provided with a high-pressure valve connected to the low-pressure valve,
    the high-pressure valve having a passing state in which compressed air from the high-pressure circuit is allowed to pass through the high-pressure braking outlet branch towards the low-pressure valve, and a blocking state in which compressed air from the high-pressure circuit is prevented to pass through the high-pressure braking outlet branch,
    the low-pressure valve having a passing state in which compressed air from the low-pressure circuit is allowed to pass through the low-pressure braking outlet branch towards the baking system, and a blocking state in which compressed air from the low-pressure circuit is prevented to pass through the low-pressure braking outlet branch while compressed air from the high-pressure circuit is allowed to pass through the low-pressure braking outlet branch towards the braking system,
    the air management system being configured so that:
    for the usual braking operation, the high-pressure valve is in the blocking state and the low-pressure valve is in the passing state,
    for the emergency braking operation, the high-pressure valve is in the passing state and the low-pressure valve is in the blocking state.

3. Commercial vehicle according to claim 2, wherein the air management system is configured so that, for the emergency braking operation, the low-pressure valve is maintained in the passing state while the high-pressure valve is moving from the blocking state to the passing state, and is moved to the blocking state when the high-pressure valve is in the passing state.

4. Commercial vehicle according to claim 2, wherein the low-pressure braking outlet branch comprises at least one low-pressure tank configured to store compressed air within the low-pressure range, the low-pressure tank presenting a tank outlet connected to the low-pressure valve, the high-pressure braking outlet branch comprises at least one high-pressure tank configured to store compressed air within the high-pressure range, the high-pressure tank presenting a tank outlet connected to the high-pressure valve.

5. Commercial vehicle according to claim 2, wherein the low-pressure circuit comprises a rear low-pressure braking outlet branch connected to a rear part of the braking system, and a front low-pressure braking outlet branch connected to a front part of the braking system.

6. Commercial vehicle according to claim 1, wherein the control unit is configured to register low-pressure cut-off pressure and high-pressure cut-off pressure, the control unit controlling the air compressor, as said air compressor is running, so that:
    if the air compressor had been started because pressure within the low-pressure circuit was below the low-pressure cut-in pressure, then
        if pressure within the high-pressure circuit is below the high-pressure cut-in pressure, then the air compressor stops running when pressure in the high-pressure circuit is above or equal to the high-pressure cut-off pressure,
        else the air compressor stops running when pressure in the low-pressure circuit is above or equal to the low-pressure cut-off pressure,
    else if the air compressor had been started because pressure within the high-pressure circuit was below the high-pressure cut-in pressure, the air compressor stops running when the pressure in the high-pressure circuit is above or equal to the high-pressure cut-off pressure.

7. Commercial vehicle according to claim 1, wherein the air management system is configured so that, when pressure in the low-pressure circuit decreases down to a critical pressure level due to a demand for compressed air at pressures within the low-pressure range by the low-pressure equipments, the low-pressure equipments are connected to the high-pressure circuit, said high-pressure circuit taking over supply of compressed air to the low-pressure equipments.

8. Method for controlling a pneumatic system of a commercial vehicle according to claim 1, comprising:
- for the usual braking operation, supplying the braking system with compressed air from the low-pressure circuit, and
- for the emergency braking operation, supplying the braking system with compressed air from the high-pressure circuit.

9. Method for controlling according to claim 8, comprising:
- for the usual braking operation, setting the high-pressure valve in the blocking state and the low-pressure valve in the passing state,
- for the emergency braking operation, setting the high-pressure valve in the passing state and the low-pressure valve in the blocking state.

10. Method for controlling according to claim 9, comprising, for the emergency braking operation, maintaining the low-pressure valve in the passing state while the high-pressure valve is moving from the blocking state to the passing state, and moving the low-pressure valve to the blocking state when the high-pressure valve is in the passing state.

11. Method for controlling according to claim 8, comprising starting running the air compressor if:
- pressure within the low-pressure circuit is below the low-pressure cut-in pressure, or
- pressure within the high-pressure circuit is below the high-pressure cut-in pressure.

12. Method for controlling according to claim 11, comprising as the air compressor is running:
- if the air compressor had been started because pressure within the low-pressure circuit was below the low-pressure cut-in pressure, then
    - if pressure within the high-pressure circuit is below the high-pressure cut-in pressure, then stop running the air compressor when pressure in the high-pressure circuit is above or equal to the high-pressure cut-off pressure,
    - else stop running the air compressor when pressure in the low-pressure circuit is above or equal to the low-pressure cut-off pressure,
- else if the air compressor had been started because pressure within the high-pressure circuit was below the high-pressure cut-in pressure, stop running the air compressor when the pressure in the high-pressure circuit is above or equal to the high-pressure cut-off pressure.

13. Method for controlling according to claim 8, comprising, when pressure in the low-pressure circuit decreases down to a critical pressure level due to a demand for compressed air at pressures within the low-pressure range by the low-pressure equipments, connecting the low-pressure equipments to the high-pressure circuit so that said high-pressure circuit takes over supply of compressed air to the low-pressure equipments.

* * * * *